United States Patent [19]

Kawasumi et al.

[11] 4,242,376

[45] Dec. 30, 1980

[54] METHOD FOR METAL PLATING OF POWDER BY SUBSTITUTION

[75] Inventors: Yoshio Kawasumi, Urawa; Mitsuo Takahashi, Tokyo, both of Japan

[73] Assignee: Nihon Kogyo Kabushika Kaisha, Tokyo, Japan

[21] Appl. No.: 85,434

[22] Filed: Oct. 16, 1979

[30] Foreign Application Priority Data

Oct. 18, 1978 [JP] Japan .................................. 53-127322

[51] Int. Cl.$^3$ ............................................. B44D 1/22
[52] U.S. Cl. ................................. 427/216; 427/217; 427/180
[58] Field of Search ................ 427/217, 215, 216, 180

[56] References Cited

U.S. PATENT DOCUMENTS

| | | | |
|---|---|---|---|
| 2,483,075 | 9/1949 | Truesdale | 427/180 |
| 3,438,805 | 4/1969 | Potrafke | 427/217 |

*Primary Examiner*—Sam Silverberg
*Attorney, Agent, or Firm*—Sughrue, Rothwell, Mion, Zinn and Macpeak

[57] ABSTRACT

A method for plating a powder with a metal by substitution, which comprises adding a crystalline powder of a metal chloride hydrate after and/or during mixing a powder to be plated and a reducing metal powder, and after the initiation of the reaction, adding water and/or hydrochloric acid.

8 Claims, No Drawings

METHOD FOR METAL PLATING OF POWDER BY SUBSTITUTION

BACKGROUND OF THE INVENTION

1. Field of the Invention

This invention relates to a method for plating a powder by substitution. More specifically, it provides a simple and inexpensive method for plating various powders with a metal having a negative standard electrode potential and especially to plating nickel and/or cobalt.

2. Description of the Prior Art

With a marked advance in the metallurgical industry, the catalytic chemistry, the electronics industry, etc. in recent years, there has been a strikingly increasing demand for various plated powders and various methods such as substitution plating, electroless plating and pressure reductive plating have been suggested.

The substitution plating, to which the present invention pertains, has been widely utilized as a simple and highly valuable method for plating powders such as metals, metal oxides, metal sulfides, carbonaceous materials, carbides and ceramics with metals such as Au, Pt, Pd, Ag, Cu, Sn, Ni and Co. The generally known substitution methods are roughly classified into a method which comprises adding a solution of a plating metal under stirring to a mixture of a powder to be plated and a reducing metal powder or to these ingredients during their mixing; and a method which comprises adding a powder to be plated and a reducing metal powder together or separately to a solution of a plating metal while stirring the solution. Both of these methods are based on reducing an ion of a plating metal with a powder of a metal which is less noble than the plating metal. It is well known therefore that in the plating of metals having a positive standard electrode potential, such as Au, Pt, Pd, Ag and Cu, both the efficiency of reduction and the plating finish are very good.

On the other hand, in plating metals having a negative standard electrode potential, such as Sn, Ni and Co, especially Ni and/or Co to which the present invention relates, both the efficiency of reduction and the plating finish are very poor. For this reason electroless plating or pressure reductive plating are used almost exclusively in plating metals of a negative standard electrode potential.

SUMMARY OF THE INVENTION

It is an object of this invention to remove the aforesaid defects of the prior substitution methods and to provide a novel method for plating a metal having a negative standard electrode potential, especially nickel and cobalt, on various powders by substitution.

According to this invention, there is provided a method for plating a metal on a powder by substitution, which comprises adding a crystalline powder of a metal chloride hydrate after and/or while mixing the powder to be plated and the reducing metal powder, and, after the initiation of the reaction, adding a small amount of water and/or hydrochloric acid to the system.

DETAILED DESCRIPTION OF THE INVENTION

Powders which can be plated by the method of this invention include those powders which can be plated with metals having a positive electrode potential. For example, metals such as Au, Ag, Pd, Cu, Sn, In, Ni, Bi, Co, Fe, Pb, Cd, W, Mo, Mn, etc.; metal oxides such as $SnO_2$, $Al_2O_3$, MgO, CdO, $Ag_2O$, $SiO_2$, etc.; metal sulfides such as $MoS_2$, $WS_2$, $Cu_2S$, etc.; carbonaceous materials such as graphite, amorphous carbon, coke, coal, etc.; carbides such as WC, TiC, SiC, etc.; nitrides such as BN, TiN, etc.; ceramics such as TiC-Co, $Al_2O_3$-Cr, etc.; etc. can be plated.

Some of the aforesaid metals, metal oxides, metal sulfides, carbonaceous materials, carbides, nitrides, borides and ceramics may be subjected in advance to an activation treatment to improve plating as in the plating of metals having a positive electrode potential. The activation treatment can be performed by known methods, such as the vacuum-deposition of a thin metal layer, the CVD method, or a method comprising depositing stannous chloride, and then contacting the deposit with a solution of palladium chloride to deposit palladium, as described in Takehiko Fujino, *Plating Technique Pocket Book*, pp 170–171 (1965), by Nikkan Kogyo Shinbunsha; Sakae Tajima, *Surface Treatment Handbook*, pp 339–342 (1969), by Sangyo Tosho, etc.

In the case of heat-resistant materials such as carbonaceous materials, the activation treatment can be performed by treating with an aqueous solution of a noble metal salt such as a Pd, Pt, Rh, Au or Ag salt, and heat-decomposing the noble metal salt to form a thin layer of the noble metal. While the treatment condition will depend on the carbonaceous material in the case of a graphite having a particle size of about 44 to 150μ, activation can be performed using a palladium solution at a concentration of about 0.2 to 0.5 g/l and heat-decomposing at 250° to 350° C.

The reducing metal powder used in this invention may be any metal which is less noble than Ni and/or Co. Generally, Ca, Mg, Al, Fe, Zn, etc. are used. Mg and Al are preferred. The particle diameter of the metal powder varies depending upon the type and particle diameter of the powder to be plated and the type of the reducing metal powder, and cannot be defined definitely. Generally the powder will range in size from about −100 mesh to +400 mesh in accordance with the Tyler standard. In the case of plating graphite having a particle diameter of about 10 to 200 microns using Al as the reducing metal powder, the preferred particle diameter of the metal powder is 40 to 100μ. The amount of the reducing metal powder is suitably about 1.10 to 1.20 times the required equivalent weight.

The sources of the plating metal in this invention are chlorides of the aforesaid metals, and a hydrated crystalline powder of the chlorides is used, e.g., $NiCl_2.2H_2O$, $CoCl_2.6H_2O$, etc. The particle size of the chloride hydrate is not critical.

The crystalline powder of the metal chloride hydrate is added to the powder to be plated and the reducing metal powder either after or during the mixing of these ingredients, and the mixture is then stirred for a short period of time, whereupon the reaction begins. With the initiation of the reaction, heat is generated and some white smoke forms. Thus, this can be used as an indicator of the initiation of the reaction. At this point, water and/or hydrochloric acid is added to the reaction mixture. The amount of water and/or hydrochloric acid is preferably such that after the end of the substitution reaction, the slurry concentration is about 500 to 700 g/l. When the amount of water and/or hydrochloric acid is too large, the efficiency of substitution decreases, and in the case of nickel plating, very fine particles of nickel form. When the amount is too small, there is a tendency that the powder having deposited thereon an insufficient amount of the plating metal sticks to the wall of the reaction vessel. Accordingly, the amount of water and/or hydrochloric acid is adjusted to avoid these two extremes.

The concentration of hydrochloric acid is preferably about 15 to 20% by weight. The use of hydrochloric acid is beneficial when it is desired to reduce the amount of residual reducing metal powder to less than 0.01 to 0.09%.

The weight ratio for the amount of reducing metal powder to the amount of metal chloride hydrate to the amount of powder to be plated cannot be unequivocally defined since it varies depending upon the plating amount, etc. However, when Ni is plated on graphite of about 40 to 150μ using nickel chloride, the weight ratio for amount of plating metal chloride hydrate: powder to be plated is about 0.2:1 to 18:1, preferably 1.7:1 to 10:1. In this case, the plating % is 28 to 70%.

Such a plating reaction is maintained uniform and in good condition by stirring the reaction mixture. The reaction is preferably carried out at about 80° to 100° C. For this purpose, a stirring device which also makes a planetary motion is preferably used and is equipped with impellers whose rotating speeds can be instantaneously adjusted.

The following examples illustrate the present invention in more detail.

EXAMPLE 1

210 g of graphite having a particle diameter of 44 to 150μ was weighed and introduced to a stainless steel plating tank adapted for planetary motion and having speed-variable impellers. Then 31.7 g of Al powder having a particle diameter of 100 to 150μ was added as a reducing metal powder. The mixture was stirred for 2 minutes. 400.8 g of nickel chloride hydrate crystal having a particle diameter of less than 500 microns was then added and the mixture was stirred for about 1 minute. White smoke began to form. At this point, 500 ml of 10% hydrochloric acid was added, and the mixture was stirred for 5 minutes to terminate the plating operation. Subsequently, the reaction mixture was filtered, washed and dried to afford 297.9 g of a nickel-plated graphite powder. The resulting powder contained 29.5% by weight of nickel and less than 0.01% by weight of aluminum. Microscopic examination (magnification 100X) showed that a uniform metal nickel layer formed on the surface of graphite, and fine particles composed of only nickel were not observed.

Comparative Example 1

Using the same apparatus as used in Example 1, 210 g of graphite having a particle diameter of 44 to 150μ and 31.7 g of aluminum powder having a particle diameter of 100 to 150μ were added to 3,000 ml of a nickel chloride solution containing 4 g/l of HCl and 40 g/l of Ni, and the substitution plating operation was performed for 2 hours at a temperature of 85° to 90° C. After the reaction, the reaction mixture was filtered, washed and dried to afford 260 g of a nickel-plated graphite powder. The resulting powder contained 23.1% by weight of Ni and less than 0.01% by weight of Al. Microscopic examination (magnification 100X) showed that there were many areas of the graphite exposed surface and many fine particles composed only of nickel formed, and therefore the plating treatment was incomplete.

As stated in detail hereinabove, the present invention provides a simple novel method suitable for plating various powdery materials with metals having a negative standard electrode potential, and the cost of plating in accordance with this method is low. In the comparative example, good results could not be obtained by simply adding a metal chloride as an aqueous solution, whereas in the present invention good results were obtained by adding metal chloride hydrate crystals, leading to the aforesaid advantages.

While the invention has been described in detail and with reference to specific embodiments thereof, it will be apparent to one skilled in the art that various changes and modifications can be made therein without departing from the spirit and scope thereof.

What we claim is:

1. A method for plating a powder with a metal by substitution, which comprises adding a crystalline powder of a metal chloride hydrate, wherein the metal of said metal chloride hydrate is a metal having a negative standard electrode potential, after and/or during mixing a powder to be plated and a reducing metal powder, and after the initiation of the reaction, adding water and/or hydrochloric acid.

2. The method of claim 1, wherein said metal is nickel and/or cobalt.

3. The method of claim 1, wherein said reducing metal is Ca, Mg, Al, Fe or Zn.

4. The method of claim 3, wherein said reducing metal is Mg or Al.

5. The method of claim 1, wherein the amount of water and/or hydrochloric acid is such that the slurry concentration after the substitution reaction is 500 to 700 g/l.

6. The method of claims 1 or 5, wherein the concentration of hydrochloric acid is about 15 to 20% by weight.

7. The method of claim 4, wherein said reducing metal is Mg.

8. The method of claim 4, wherein said reducing metal is Al.

* * * * *